United States Patent [19]

Smith

[11] 4,342,223
[45] Aug. 3, 1982

[54] METHOD AND APPARATUS FOR CALIBRATING FIRING PIN IMPACT

[76] Inventor: James L. Smith, 4001 Sul Ross, Apt. 330, San Angelo, Tex. 76904

[21] Appl. No.: 170,824

[22] Filed: Jul. 21, 1980

[51] Int. Cl.³ .............................................. G01L 1/22
[52] U.S. Cl. .................................................... 73/167
[58] Field of Search ...................... 73/167, 862.65, 12

[56]        References Cited
    U.S. PATENT DOCUMENTS

| | | | |
|---|---|---|---|
| 2,467,752 | 4/1949 | Howe | 73/862.65 X |
| 3,402,601 | 9/1968 | Heineman | 73/862.65 X |
| 3,435,658 | 4/1969 | Arthur | 73/12 |
| 3,621,927 | 11/1971 | Ormond | 73/862.65 |
| 3,972,222 | 8/1976 | Yonkers et al. | 73/12 |
| 4,283,942 | 8/1981 | Fishfader | 73/862.65 |

*Primary Examiner*—Jerry W. Myracle
*Attorney, Agent, or Firm*—Dennis T. Griggs

[57]        ABSTRACT

An impact calibrator for use with firearms is disclosed. Impact of the firing pin on a cartridge unit creates a voltage signal detectable by a calculator unit. The calculator unit computes and displays the impact force of the firing pin.

7 Claims, 4 Drawing Figures

METHOD AND APPARATUS FOR CALIBRATING FIRING PIN IMPACT

BACKGROUND OF THE INVENTION

1. Field of the Invention

The present invention relates generally to impact measurement devices, and specifically to devices for measuring the impact of the firing pin in firearms.

2. Description of the Prior Art

In the operation of firearms, it is desirable to have control over the force of impact of the firing pin on the ammunition. If the impact force of the firing pin is too great, the aim of the marksman may be adversely affected. If the force of impact is too small, the ammunition may not fire. These considerations are especially important in competition shooting, where accuracy and reliability are essential.

The firing pin is typically powered by a spring loaded mechanism, and the tension of the spring can be varied. However, there is no way to measure the impact force of the firing pin on the ammunition, and therefore no guideline for precise adjustment of the firing pin mechanism. At present, the firearm must be test fired to determine whether the setting of the spring mechanism is appropriate. If the ammunition fails to fire, the force of impact must be increased. If the operator of the firearm notices a jerking effect, force of impact of the firing pin may need to be diminished. The accuracy of this adjustment procedure is wholly dependent upon the skill of the operator.

Numerous devices have been designed to measure the effect of an impact on a test material. A known impact force is applied to a test material to determine its properties under the effect of the impact. A method such as this could be used in reverse to estimate the magnitude of an unknown impact. A material of known characteristics could be impacted, and the effects as measured on the test material would indicate the magnitude of the impact force. However, this procedure could not be used well with firearms. The testing mechanism to calibrate the impact force of a firearm must be used without disassembly of the firearm. Additionally, an attempt to measure the impact force using this method would be so inaccurate as to render it substantially useless.

SUMMARY OF THE INVENTION

An object of the present invention is to provide a device which is insertable in the firing chamber of a firearm and which can be used to detect the force of impact of a firing pin. According to one feature of the invention, a casing which is insertable into a firing chamber of a firearm is provided. A transducer is disposed within the casing, and means are provided at the breech end of the casing for transferring the force of impact of the firing pin to the transducer. A feature of the invention is that none of the impact force is transmitted directly to the casing. The impact force is transmitted indirectly to the casing only through the reaction of the transducer against the casing.

A further feature of the present invention is that the transducer comprises a strain gauge bonded to a core member. The core member is not as rigid as the casing, so that a force applied to it causes a stress in the core member. Stress is induced in the strain gauge, causing its resistance to vary proportional to the stress applied to the core member. This changing resistance is detected externally of the casing through leads coupled to the strain gauge.

Another object of the present invention is to provide an apparatus for computing the impact force of a firing pin in a firearm. A feature of the invention provides a calculating unit electrically coupled to a detecting device as previously described. The input to the calculator unit is designed so that the strain gauge of the detecting device constitutes one arm of a resistance bridge. The change in resistance of the strain gauge, resulting from an impact of the firing pin, causes a voltage differential across the output of the bridge. This differential is proportional to the force of impact, and is sealed, computed and displayed in the calculating device.

The calculating device can be calibrated to accurately display the force of impact, or it can be used merely as a comparative device. Used as a comparator, the calculating device need not be calibrated accurately, because only the relative magnitudes of a succession of impacts is of interest.

A further object of the present invention is to provide an apparatus which can be used for calibrating the impact force of a firing pin, which is accurate, can be reused indefinitely, and is easily operated. The calculating device used in the present invention can be easily calibrated to give high accuracy in the readings of impact force. The detecting device is contained in a cartridge unit, which can be used as often as desired as it is not destroyed by use. Operation consists merely of inserting the cartridge unit into the firing chamber, and firing the firearm as if it were loaded with ammunition. The impact force is then read from the display of the calculating unit.

Yet another object of the present invention is to provide an apparatus which can be used on all types of firearms. The cartridge unit need merely be made a suitable size, and the same cartridge unit can be used in all firearms having the same caliber.

A further feature of the present invention provides that the electrical leads leaving the cartridge unit can be located in either of two positions as explained more fully in the detailed description. This allows the apparatus to be used with revolver or automatic type firearms.

A further object of the present invention is to provide a method for calibrating the force of impact of a firing pin. This is done by activating the firing pin mechanism with an impact detecting device in the firing chamber. A voltage signal which is proportional to the force of impact is created by the detecting device. This signal is read by the calculating device, which suitably amplifies it and displays the force of impact where it can be read by the operator of the firearm. The tension of the firing pin spring mechanism can be adjusted if necessary, and the procedure repeated to insure that the spring mechanism of the firearm is properly tensioned.

The novel features which characterize the present invention are defined by the appended claims. The foregoing and other objects and advantages of the invention will hereinafter appear, and for purposes of illustration, but not of limitation, two exemplary embodiments are shown in the drawings.

DETAILED DESCRIPTION OF THE PREFERRED EMBODIMENTS

Figure 1:
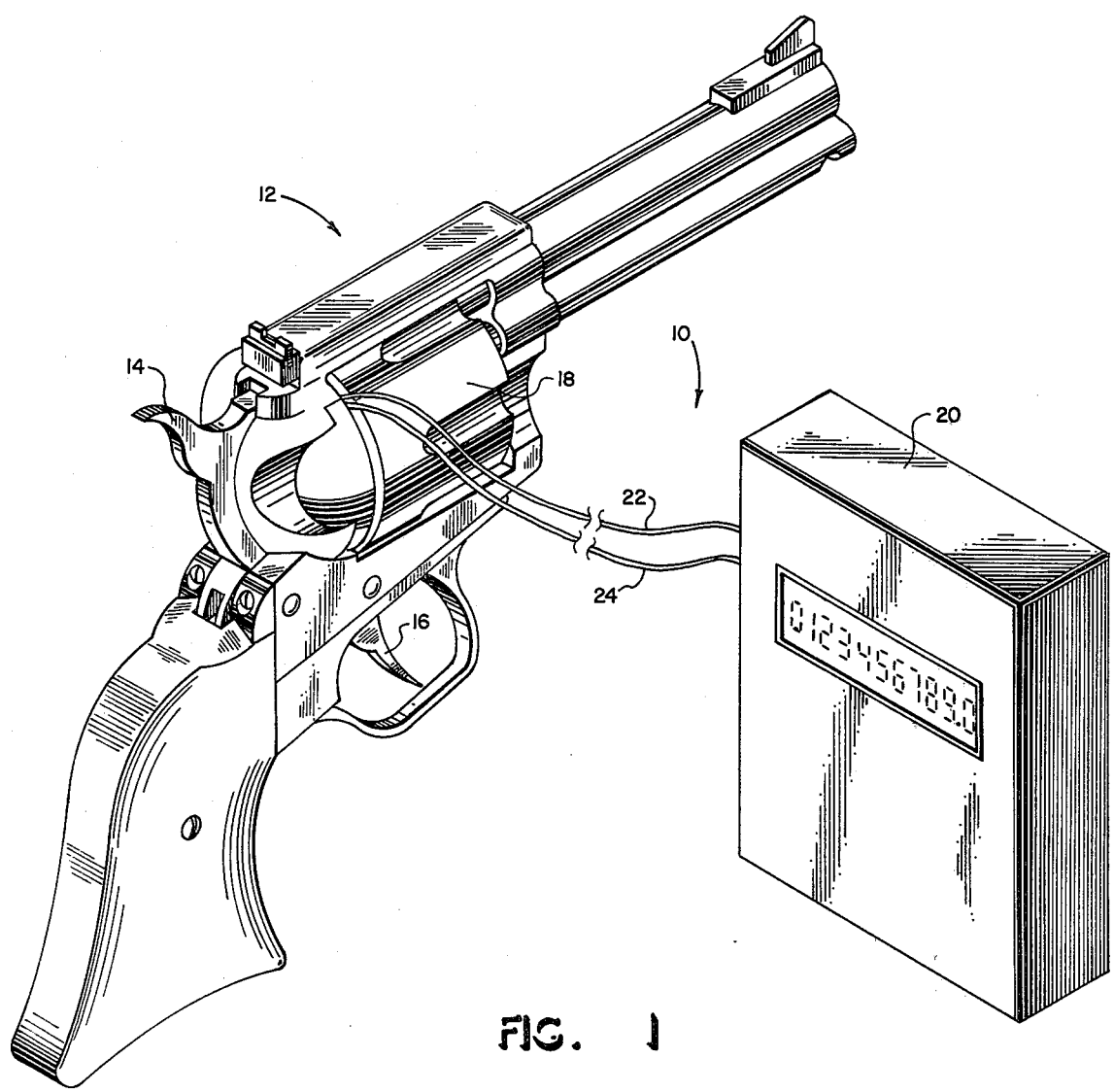
FIG. 1 is a perspective view of an apparatus for calibrating the impact force of a firing pin for a firearm as used in a revolver.

A preferred embodiment of the present invention is herein described in detail. Referring to FIG. 1, an impact calibrator 10 is designated generally by the number 10. A revolver 12, having a hammer 14 and a trigger 16, is shown for the purpose of illustrating the use of the present invention. It is understood that the present invention may be used with other firearms, such as automatic pistols and rifles. The gun cylinder 18 has a plurality of firing chambers (not shown), each of which is suitable for receiving ammunition. The portion of the hammer 14 which impacts against ammunition contained in a firing chamber of the cylinder 18 is a firing pin (not shown). The hammer 14 is pulled away from the cylinder 18 until locked in place by an internal mechanism (not shown). The hammer 14 is spring loaded, and moves forward at a high speed when the internal mechanism is released in response to movement of the trigger 16. The present invention can be used to measure the force of the firing pin portion of the hammer 14 on ammunition contained within the cylinder 18. The force of the spring loading on the hammer 14 can then be adjusted if necessary.

Figure 2:
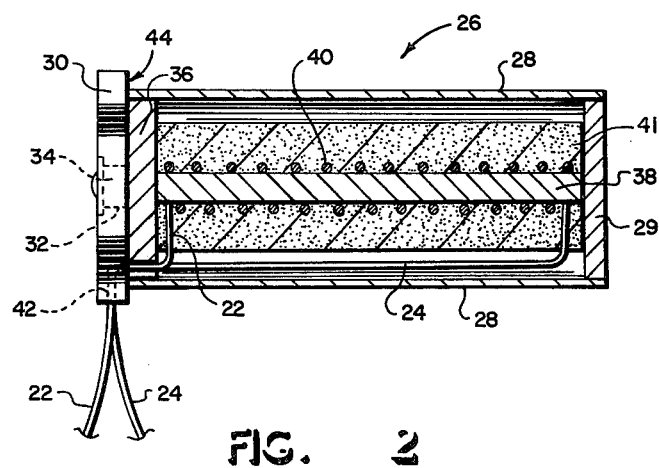
FIG. 2 is a sectional view of a device to be placed in the firing chamber of a firearm.

The impact calibrator 10 comprises generally a calculating unit 20, two electrical leads 22, 24 which provide an input to the display unit 20, and a cartridge unit which is designated generally by the number 26 in FIG. 2.

Referring to FIG. 2, the cartridge unit 26 fits slidably within a firing chamber of the cylinder 18. In the present embodiment, the cartridge unit 26 is substantially the same size and shape as a shell casing of ammunition for the revolver 12.

The cartridge unit 26 has a casing 28, which has a closed end 29 and a cap 30 which covers the open breech end of the casing 28. The cap 30 is rigidly attached to the casing 28, and both are formed of a rigid material such as steel or brass which is not deformed by the forces normally met in operation of the impact calibrator 10. The cap 30 has an aperture 32 in the center. An actuator 34 is disposed movably within the aperture 32 in a manner such that no part of an impact force directed against the actuator 34 from a direction substantially perpendicular to the plane of the cap 30 is transmitted to the cap 30.

An anvil 36 is substantially circular and fits slidably within the casing 28. The actuator 34 is affixed to the anvil 36. A core member 38 is coupled to the anvil 36 and to the closed end 29. The core 38 is rigid, but less so than the casing 28. The core 38 is cylindrical, and a helical grid strain gauge 40 is bonded very firmly to the core 38 by means of a deposit of bonding cement 41. The bonding cement 41 may be any type of compound generally used in the bonding of strain gauges. The electrical leads 22, 24 are attached to the ends of the strain gauge 40 and exit the cartridge unit 26 through a lead slot 42 in the side of the cap 30. The leads 22, 24 exit the cartridge unit 26 at this point so that they do not interfere with the placement of the cartridge unit 26 into the firing chamber of the cylinder 18.

The cartridge unit 26 operates as follows. The action of the firing pin portion of the hammer 14 of FIG. 1 impacts on the actuator 34. The force of impact is transmitted through the actuator and the anvil 36 to the core 38. The cap 30 is larger than the diameter of the casing 28, thereby forming a shoulder 44 and preventing the cartridge unit 26 from moving in the firing chamber. The entire force of impact is absorbed by the core 38. The core 38 is compressed slightly against the closed end of the casing 28, causing a strain in the core 38. This strain is registered by the helical strain gauge 40, which reacts to the strain by changing the value of the resistance measured across the ends of the strain gauge 40. The electrical leads 22, 24 which are attached to the ends of the strain gauge 40 enable this variation in resistance to be detected.

Figure 3:
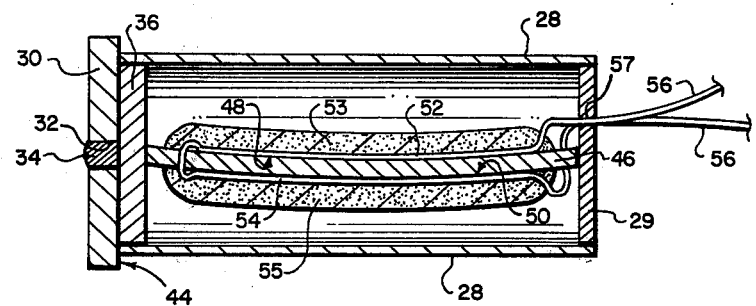
FIG. 3 is an alternative embodiment of the device to be placed in the firing chamber of a firearm; and, FIG. 4 is a block diagram of an electronic device used to register the impact of a firing pin.

Referring to FIG. 3, an alternative embodiment of the cartridge unit 26 is shown. The casing 28, casing end 29, cap 30, aperture 32, actuator 34, and anvil 36 are identical to and function the same as in the embodiment of FIG. 2. An arched core member 46 is fixably attached to the center of the anvil 36 and to the closed casing end 29. The arched core 46 has a concave surface 48 and a convex surface 50. A first strain gauge 52 of a standard type is bonded to the concave surface 48 with bonding cement 53. A second strain gauge 54, of the same type as the first strain gauge 52, is bonded with cement to the convex surface 50. The wires or foil strips of the strain gauges 52, 54 are aligned along the length of the core member 46. Electrical leads 56 are attached to both ends of each strain gauge 52, 54, and exit the casing 28 through a lead slot 57 in the closed end 29. Locating the lead slot 57 in this position permits the cartridge unit 26 to be used with automatic firearms.

The arrangement of electrical leads 22, 24 shown in FIG. 2 and that of electrical leads 56 shown in FIG. 3 are interchangeable. That is, either lead arrangement can be used with either embodiment of the cartridge unit 26. The choice of lead arrangements depends on the physical characteristics of the firearm being tested. A lead arrangement is chosen which will permit the cartridge unit 26 to be inserted properly into the firing chamber.

The operation of the alternative embodiment disclosed in FIG. 3 is similar to that of the embodiment shown in FIG. 2. The difference is that an impact on the actuator 34 will subject the arched core member 46 to a warping force instead of a compressive force. The strain gauges 52, 54 detect the strain on the arched core member 46 due to this warping force. Although the embodiment of FIG. 3 shows two strain gauges 52, 54, either the first strain gauge 52 or the second strain gauge 54 may be omitted if desired. The coaction of two strain gauges 52, 54 doubles the sensitivity of the impact calibrator 10.

Figure 4:
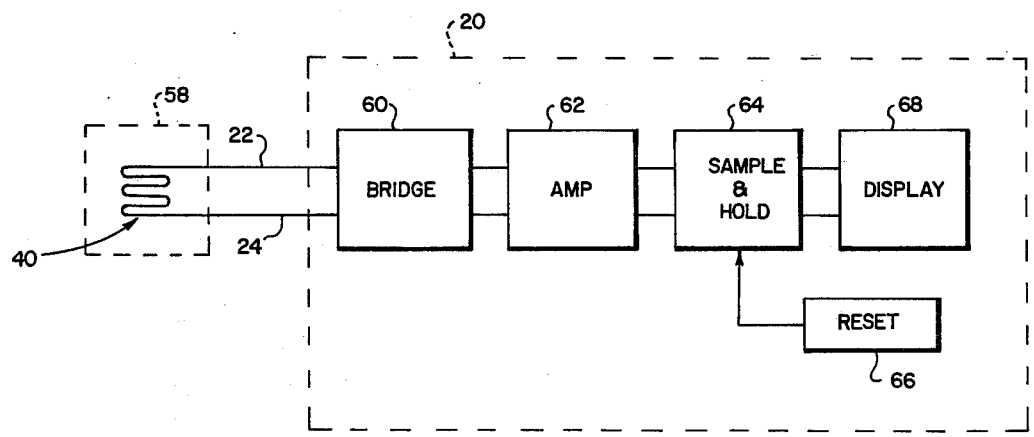

Referring to FIG. 4, a block diagram of the calculating unit 20 is shown. A functional block for the cartridge unit is enumerated as number 58. The function of the cartridge unit 26 as illustrated in FIG. 2 is used to illustrate the operation of the calculating unit 20. Electrical leads 22 and 24 connect the calculating unit 20 to the cartridge unit 58. The strain gauge 40 is wired into a resistance bridge 60. A small voltage differential is created across the output terminals of the bridge 60 as a result of the change in resistance of the strain gauge 40 caused by an impact on the cartridge unit 58. This small voltage differential is amplified by a standard voltage amplifier 62, and the output of the amplifier is fed into a sample and hold circuit 64. The sample and hold circuit 64 is a peak voltage detector, the design of which is well-known in the art.

The purpose of the sample and hold circuit 64 is to preserve the information obtained from a cartridge unit 58 during an impact. The impact signal will usually be of too short a duration to be observed directly. Therefore, the sample and hold unit 64 registers the peak voltage differential created across the bridge 60, and retains it as long as needed. A reset circuit 66 allows the result of the prior test run to be cleared from the sample and hold circuit 64 in preparation for further use. The output of the sample and hold unit 64 drives a display unit 68. The display unit 68 can be any unit capable of registering the voltage output of the sample and hold unit 64. A display unit 68 can be, for example, an analog meter, a strip chart recorder, or a digital display device. In the preferred embodiment, the display 68 is a digital display.

The impact calibrator 10 may be used to measure the true force of impact on the actuator 34, or it can be used merely to indicate the relative magnitudes of a series of impacts. The gain of the amplifier 62 must be adjusted precisely and scaled suitably if the actual force of impact is required. The calculator unit 20 can be calibrated by striking the actuator 34 with a known impact force, and adjusting the amplifier 62 to cause this value to register on the display 68. The gain adjustment of the amplifier 62 is not critical if merely the relative magnitudes of a series of impacts are needed.

Although a preferred embodiment has been described in detail, it should be understood that various substitutions, alterations, and changes may become apparent to those skilled in the art. These modifications may be made without departing from the spirit and scope of the invention as defined by the appended claims.

What is claimed is:

1. An apparatus for calibrating the impact force of a firing pin of a firearm, said apparatus comprising:
   a casing insertable into the firing chamber of the firearm, said casing having a cap for engaging the firing chamber housing when said casing is fully inserted into said firing chamber;
   means disposed in said casing for transducing the mechanical effect of an impact to an electrical effect, said transducing means being anchored to said casing;
   means electrically coupled with said transducing means for detecting the electrical effect of an impact; and,
   actuating means mechanically coupled to said transducing means and movable with respect to said casing for transmitting the firing pin impact force to said transducing means.

2. A device insertable into the firing chamber of a firearm for calibrating the firing pin impact force comprising:
   a substantially cylindrical casing;
   a cap coupled to said casing, said cap having an aperture in the center and covering one end of said casing, said cap having a shoulder projecting radially from said casing for engaging the firing chamber housing;
   an actuator movably disposed in the aperture;
   an anvil coupled to said actuator and movably disposed within said casing, whereby an impact on said actuator will be transmitted to said anvil;
   a core member fixably coupled to said anvil and to said casing; and,
   a resistance strain guage bonded to said core member.

3. A method for calibrating the impact force of a firing pin in a firearm consisting of the steps of:
   impacting the firing pin against a device which exhibits a change in resistance proportional to the force of impact; and,
   detecting the change in resistance.

4. The method of claim 3 further comprising the steps of:
   calculating the force of impact of the firing pin from the result of said detecting step; and,
   displaying the result of said calculating step.

5. The method of claim 4 wherein said displaying step uses a digital readout display.

6. The method of claim 4 wherein the change of resistance device comprises:
   a casing insertable into the firing chamber of the firearm, said casing having a first closed end and a second closed end, and the second closed end having an aperture;
   an actuator slidably disposed within the aperture;
   a core member coupled to said actuator and to the second closed end; and,
   a resistance strain gauge bonded to said core member.

7. An apparatus for use in calibrating the impact force of a firing pin of a firearm, said apparatus comprising:
   a casing insertable into the firing chamber of the firearm;
   means disposed in said casing for transducing the mechanical effect of an impact to an electrical effect, said transducing means including an actuator disposed to be impacted by the firing pin, a core member coupled to said actuator and to the inside of said casing and a resistance strain guage bonded to said core member; and,
   means electrically coupled with said transducing means for detecting the electrical effect of an impact.

* * * * *